(12) United States Patent
Austerlitz et al.

(10) Patent No.: US 7,418,860 B2
(45) Date of Patent: Sep. 2, 2008

(54) ULTRASONIC FLUID LEVEL SENSOR

(75) Inventors: Howard Austerlitz, Stony Brook, NY (US); Martin Hewitt, Selden, NY (US)

(73) Assignee: Parker-Hannifin Corporation, Cleveland, OH (US)

( * ) Notice: Subject to any disclaimer, the term of this patent is extended or adjusted under 35 U.S.C. 154(b) by 251 days.

(21) Appl. No.: 11/240,807

(22) Filed: Sep. 30, 2005

(65) Prior Publication Data

US 2006/0090563 A1    May 4, 2006

Related U.S. Application Data

(60) Provisional application No. 60/616,113, filed on Oct. 5, 2004.

(51) Int. Cl.
*G01F 23/296* (2006.01)
(52) U.S. Cl. .................................. 73/290 V
(58) Field of Classification Search ............ 73/290 V
See application file for complete search history.

(56) References Cited

U.S. PATENT DOCUMENTS

| | | | |
|---|---|---|---|
| 3,357,246 A | 12/1967 | Stearn et al. | |
| 4,056,761 A * | 11/1977 | Jacoby et al. | 318/116 |
| 4,320,659 A | 3/1982 | Lynnworth et al. | |
| 4,325,255 A | 4/1982 | Howard et al. | |
| 4,614,115 A | 9/1986 | Pelletier et al. | |
| 4,890,490 A | 1/1990 | Telford | |
| 5,119,676 A * | 6/1992 | Bower et al. | 73/290 V |
| 5,663,503 A | 9/1997 | Dam et al. | |
| 6,202,484 B1 * | 3/2001 | Willner et al. | 73/290 V |
| 6,323,584 B1 * | 11/2001 | Brown | 310/334 |
| 6,536,275 B1 | 3/2003 | Durkee et al. | |

FOREIGN PATENT DOCUMENTS

| | | |
|---|---|---|
| GB | 2 312 509 A | 10/1997 |
| JP | 02-190716 | 7/1990 |

* cited by examiner

*Primary Examiner*—Hezron E. Williams
*Assistant Examiner*—Paul M West
(74) *Attorney, Agent, or Firm*—Renner, Otto, Boiselle & Sklar, LLP (57) ABSTRACT

A fluid level sensor for determining a fluid level within a container, includes a transducer for generating sonic or ultrasonic waves and a wave guide. The wave guide has a first end operatively coupled to the transducer and a second end for immersion into the fluid, the second end spaced a predetermined distance from the first end, wherein a gap is formed between the first end and the second end. The sensor can be used to measure a fluid level using both an impedance mismatch signal and a fluid conductance signal.

24 Claims, 8 Drawing Sheets

ULTRASONIC FLUID LEVEL SENSOR

RELATED APPLICATION DATA

This application claims priority of U.S. Provisional Application No. 60/616,113 filed on Oct. 5, 2004, which is incorporated herein by reference in its entirety.

FIELD OF THE INVENTION

The present invention relates generally to fluid level sensors and, more particularly, to a method and apparatus for determining a level of fuel in an aircraft fuel tank using an ultrasonic fluid level sensor.

BACKGROUND OF THE INVENTION

Conventional non-continuous fluid level sensors used in aircraft fuel systems typically are based on two-wire thermistors or float switches. Conventional thermistor-type aircraft fuel level sensors monitor the temperature change of the sensor as power is applied to the sensor. If the sensor is immersed in the fuel, the temperature will not change significantly, as the fuel acts as a heat sink. However, if the sensor is not immersed in the fuel, the power applied to the thermistor causes the sensor temperature to rise, thereby signaling that the sensor is not immersed in the fuel.

Recently, the Federal Aviation Administration has enacted Special Federal Aviation Regulation Number 88 (SFAR 88). SFAR 88 requires certain Type Certificate and Supplemental Type Certificate (STC) holders to conduct a system safety review of fuel tank systems on transport category airplanes. The above described thermistor fuel level sensor is not compatible with SFAR 88.

Float switches are another type of conventional non-continuous fluid level sensor. A float switch relies upon a magnet in a float that rides along a vertical rod and activates a reed switch in the rod at the desired fluid level (set point). This type of sensor is based upon mechanical motion and is prone to reliability problems and limited operating life.

Fluid level sensors have been used for other level sensing applications. However, these sensors typically are multi-transducer systems that utilize three or four wire configurations, which are not compatible with existing two-wire level sensors used in aircraft fuel tanks.

Further, conventional single-transducer ultrasonic sensors usually depend on a minimum propagation time of the ultrasonic wave in the fluid, resulting in a relatively long sensor and large minimum sensing height (e.g., around two to four inches above the bottom of a liquid container or tank). Such sensors rely on an ultrasonic wave traveling in a fluid reflecting off a target surface. Thus, changes in the target surface (e.g., due to contamination, degradation, etc.) can degrade sensor performance.

By way of further example, U.S. Pat. No. 4,320,659 to Lynnworth discloses an ultrasonic sensor that generates vertically polarized shear-mode (SV) ultrasonic waves, which interact with surrounding fluids through the length of the ultrasonic propagation path. The sensor relies on the SV waves "leaking" into the surrounding fluid.

U.S. Pat. No. 4,325,255 to Howard discloses a two-transducer system (e.g., one transducer for transmitting and the other transducer for receiving the ultrasonic wave) mounted in a sensor head and using a closed loop servo system for measurements.

U.S. Pat. No. 4,614,115 to Pelletier discloses a sensor based primarily on the use of non-longitudinal waves (shear waves) generating multiple (secondary) reflections off the lateral walls of a sensing rod immersed in material to be tested. These secondary waves propagate outside of the lateral walls of the sensor rod and interact with the surrounding medium. Pelletier is primarily concerned with the change in amplitude of the non-longitudinal secondary reflections over time (as a measure of change in properties of the surrounding system).

U.S. Pat. No. 4,890,490 to Telford uses Lamb waves (flexural waves) propagating in a thin metal plate (waveguide). These relatively slow, low frequency Lamb waves are designed to travel relatively long distances (tens of meters) in their sheet metal wave guide and exhibit a change in amplitude at discontinuities when fluid is present/absent.

SUMMARY OF THE INVENTION

The present invention provides a fluid level sensor and method that utilizes an impedance mis-match to effect reflections of sonic and/or ultrasonic waves for measurement of a fluid level. In a preferred embodiment, there is provided a fluid level sensor that can combine a fluid conductance signal with an internal reflection signal to provide multiple data for determining whether or not an active sensor surface is immersed in the fluid. The fluid conductance signal can be produced by providing a fixed gap in a wave guide or active sensor body. Also, the time delay of an internal reflection signal can be measured, which can be used to determine the sensor's temperature (relative to a single calibration temperature).

More specifically, the sensor can use a combination of both the amplitude of a reflection pulse from the end of a sensing surface and additional reflection pulses that propagate across a gap through the measured fluid. The sensor can be a single point (i.e., single transducer) sensor, wherein the transducer is used as both the transmitter and receiver of the sonic/ultrasonic waves, thus requiring only two wires. This is advantageous in that multi-transducer systems require at least three and preferably four wires. Thus, the sensor can be used to replace older two-wire sensors, such as thermistors, float switches, etc., without rewiring.

Further, the sensor can utilize longitudinal waves, which reduce background clutter and their internal reflections. The use of longitudinal waves also enables the use of simplified electrical filtering techniques, and longitudinal waves can be generated using very little energy. This is particularly advantageous in applications that require an added level of safety (e.g., aircraft fuel systems), as low energy or low power generation of waves minimizes the risk of undesirable events, such as fuel ignition, for example. The sensor also can use simple detection electronics based on a gated level detector, for example. Alternatively, the received signal can be digitized and additional information (e.g., temperature) can be extracted from the digitized signal via a microprocessor.

The sensor can use a first or internal return pulse (which can be entirely contained within the sensor body) as a source of built-in-test. For example, the internal return pulse can be used to verify that the sensor and the associated electronics are operating properly. The sensor also can include a suppressor, such as a safety resistor in parallel with the transducer. As will be appreciated, devices other than a resistor may be used as the suppressor. The safety resistor can prevent the generation of high voltages due to mechanical shock and/or vibration of the sensor. The value of the resistor can be selected to fit within a "bin" that defines a particular sensor parameter, such as temperature calibration, threshold calibration or sensor type identification code, for example. Another advantage of the sensor is that includes one of the sonic/ultrasonic signals within the sensor body. This is advantageous in that it can eliminate problems associated with contamination, degradation, etc., of the target surface.

Accordingly, the invention provides a fluid level sensor for determining a fluid level within a container, comprising: a transducer for generating sonic or ultrasonic waves; and a wave guide having a first end operatively coupled to the transducer and a second end for immersion into the fluid, said second end spaced a predetermined distance from the first end, wherein a gap is formed between the first end and the second end.

According to another aspect, there is provided a fluid level sensor for determining a fluid level within a container, comprising: a transducer for generating sonic or ultrasonic waves; a wave guide having a first end operatively coupled to the transducer and a second end, said second end spaced a predetermined distance from the first end; and a sleeve having side walls and a bottom wall, wherein the sleeve is configured to fit over the second end so as to create a gap between the second end and the bottom wall.

According to yet another aspect, there is provided an aircraft fuel level monitoring system, comprising: a fuel tank for holding fuel; an indicator providing a signal indicative of a fuel level in the fuel tank; and a fluid level sensor mounted in the fuel tank, said sensor comprising; a transducer for generating sonic or ultrasonic waves; a wave guide having a first end operatively coupled to the transducer and a second end for immersion into the fluid, said second end spaced a predetermined distance from the first end, wherein a gap is formed between the first end and the second end, wherein the sensor is operatively coupled to the indicator so as to cause the indicator to signal when the fuel is at a predetermined level.

According to another aspect, there is provided a method of determining a fluid level within a container, comprising the steps of: injecting at least one sonic or ultrasonic wave into a wave guide, said wave guide including a gap formed in the wave guide; determining the fluid level based on a fluid conductance signal and an impedance mismatch signal.

According to yet another aspect, there is provided a fluid level sensor for determining a fluid level within a container, comprising: a transducer for generating sonic or ultrasonic waves; a wave guide having a first end operatively coupled to the transducer and a second end for immersion into the fluid; and at least one suppressor electrically coupled to the transducer, said suppressor minimizing the generation of voltage spikes due to shock or vibration inflicted on the sensor.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed.

DETAILED DESCRIPTION

The present invention relates to a sonic/ultrasonic fluid level sensor for determining the level of a fluid within a container or the like. According to one embodiment, the fluid level sensor includes a single point transducer for generating sonic/ultrasonic waves, wherein the transducer can both transmit and receive sonic/ultrasonic signals. The use of a single point transducer enables the sensor to be used in existing two wire applications (e.g., in an existing two-wire thermistor system or the like) without requiring new or additional wiring. The sensor includes a sensor housing, which is coupled to or otherwise houses the transducer. The sensor housing includes a body portion that extends from the ultrasonic sensor. The body portion can be a solid body, or can include solid portions (e.g., one or more solid columns extending through the body, a donut shape body having a hold in a center region, etc.) that can conduct sonic/ultrasonic signals through the body.

Figure 1A:
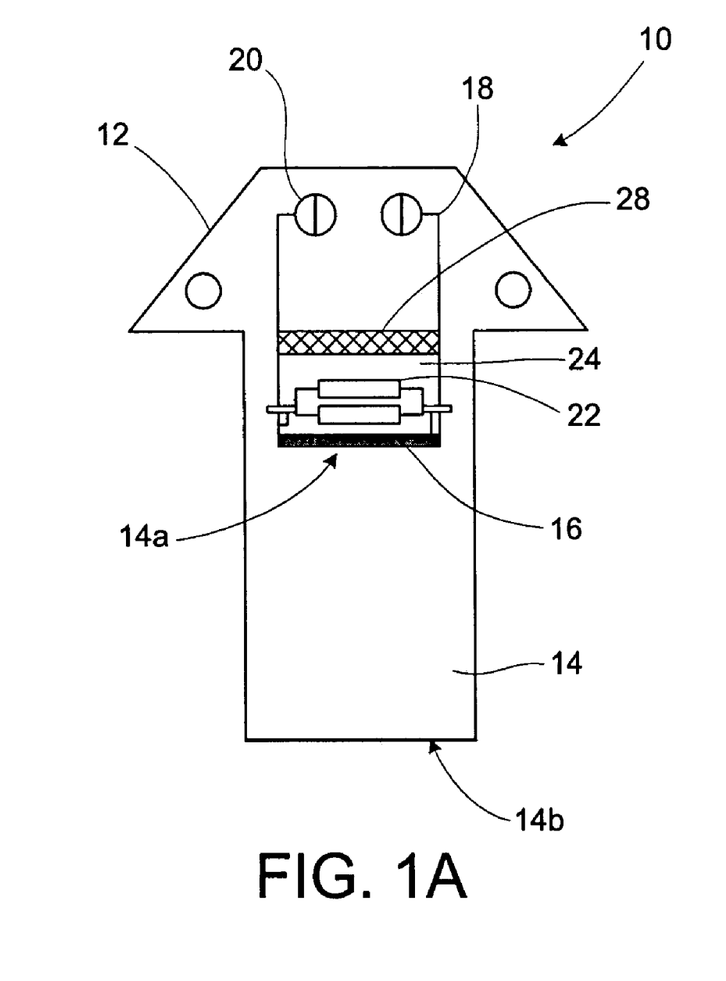
FIGS. 1A and 1B are front and side views of an ultrasonic level sensor in accordance with an embodiment of the invention.
Figure 1B:
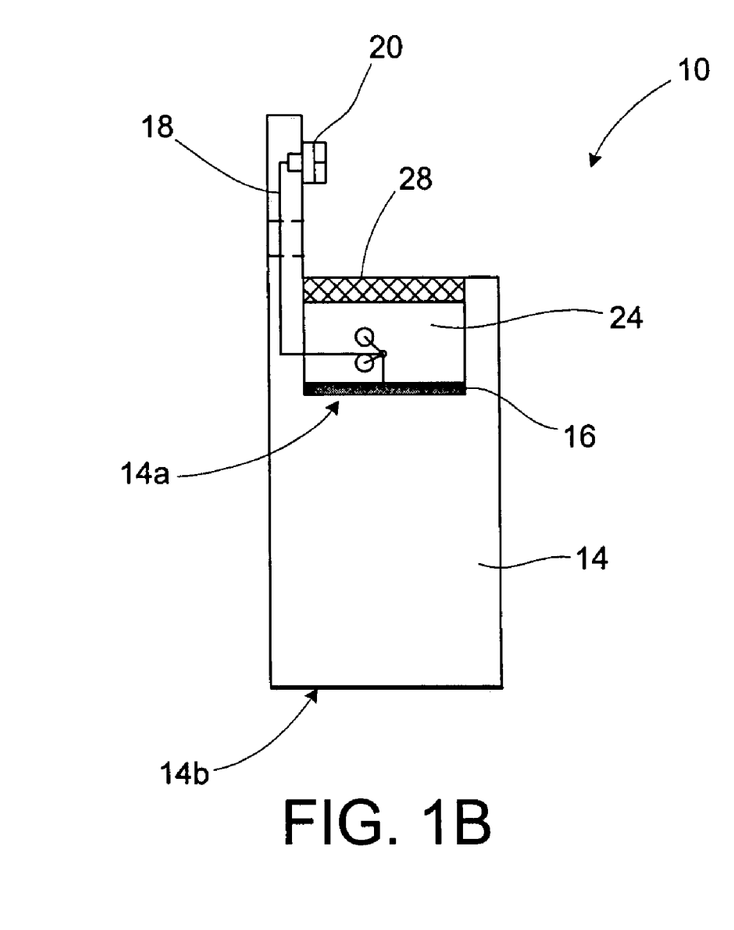

Referring to FIGS. 1A and 1B, front and side schematic diagrams of a sensor 10 in accordance with the first embodiment are shown. The sensor 10 includes a housing 12 having a body 14 extending therefrom. The body can be formed from plastic, for example, or any other material suitable for use in the target fluid. Preferably, the body is formed from a material that resists the fluid environment, e.g., a fuel level sensor should be formed from a material that can withstand being immersed in the fuel. Preferably, the body 14 has a circular cross section, although other shapes also are contemplated (e.g., rectangular, hexagonal, etc.). The housing also includes a transducer 16, such as a piezoelectric transducer, for example. As will be appreciated, other types of transducers that can generate sonic/ultrasonic waves can be used. Preferably, the transducer generates ultrasonic waves in the range of about 1 to 25 megahertz (MHz). The transducer 16 is coupled to a first end 14a of the body 14, such that sonic/ultrasonic waves generated by the transducer 16 are communicated to the body 14.

Electrically coupled to the transducer 16 are leads 18, which in turn are electrically coupled to terminals 20. As will be appreciated, if the sensor will be immersed in an electrically conductive fluid, a liquid-tight connection mechanism should be Used in place of exposed terminals. Signals can be transmitted to or received from the transducer 16 via the terminals 20 and leads 18. One or more safety/calibration resistors 22, which provide sensor calibration information, are electrically coupled between the respective terminals 20 such that the resistors 22 are in parallel with the transducer 16.

Further, the one or more safety/calibration resistors 22 can prevent or inhibit the generation of high voltages due to mechanical shock and/or vibration conditions, as discussed in more detail below. This is particularly advantageous in applications that require a high level of safety, such as aircraft fuel systems, for example. The resistors 22 can be encased within a potting compound 24, as is conventional, and an anti-reflection layer 26 is formed over the potting compound 24. The anti-reflection layer 26 minimizes the reflection of ultrasonic waves within the housing 12 and, therefore, increases the accuracy of the sensor 10 by minimizing false signals. The anti-reflection layer can be formed from a poly foam layer, for example, or any material that prevents back reflections of the sonic/ultrasonic wave.

Figure 2:
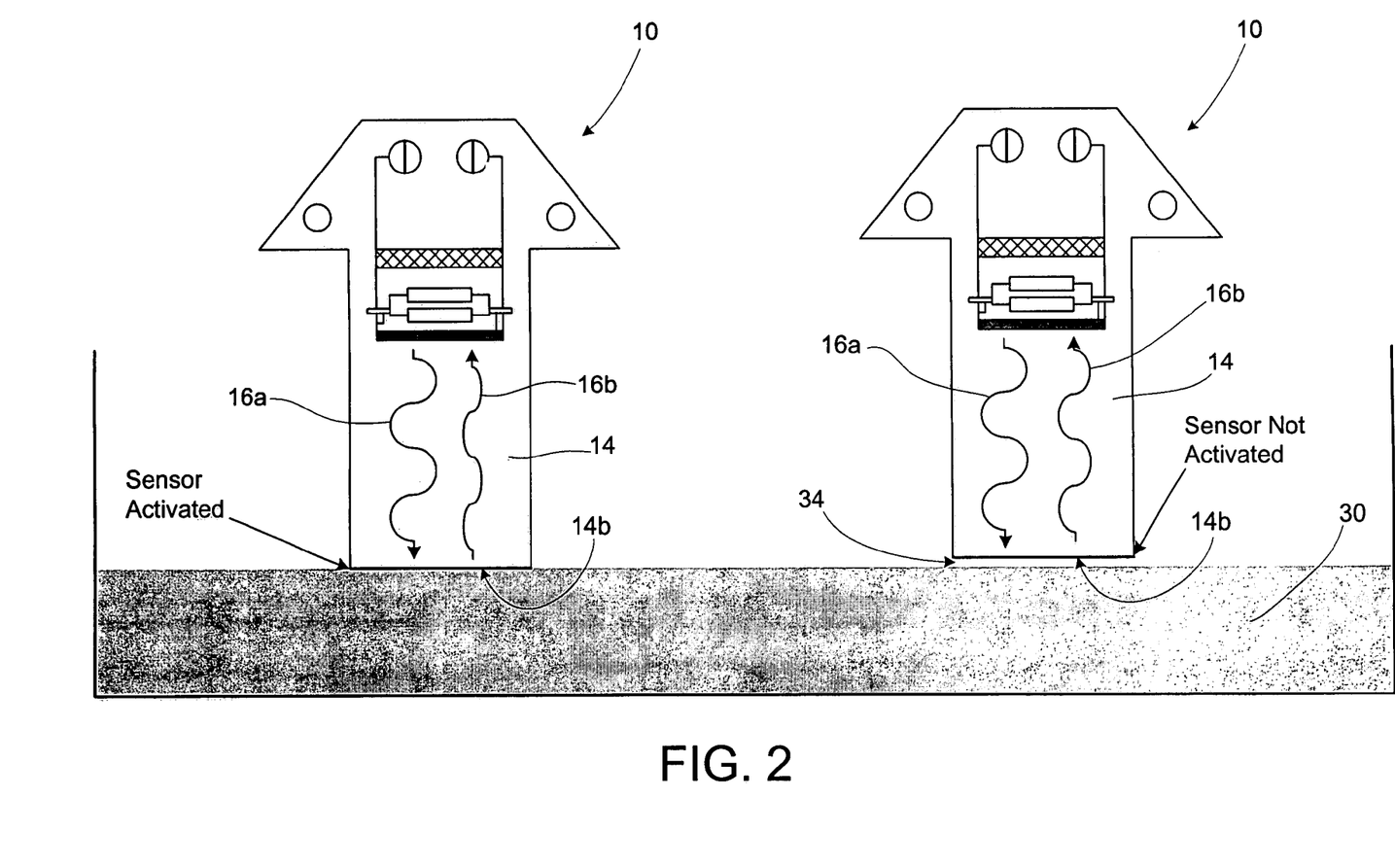
FIG. 2 illustrates that different reflected waves are obtained when the sensor is in a fluid and not in a fluid.
Figure 3:
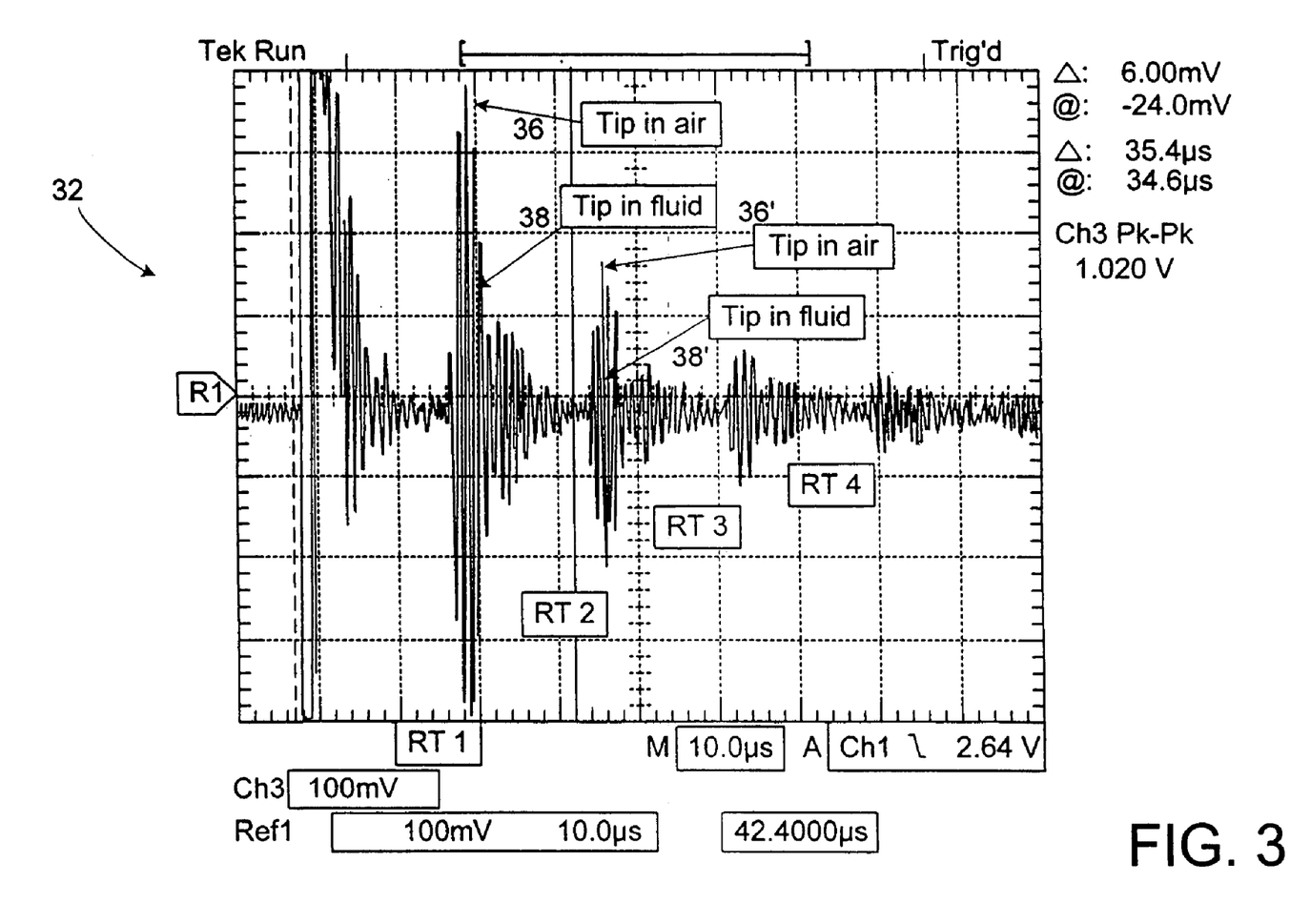
FIG. 3 is an oscilloscope recording of measurements obtained using the sensor of FIGS. 1A and 1B.

In operation, and with further reference to FIG. 2, the wave guide or sensor body 14 is immersed in the fluid 30, and, via the terminals 20 and leads 18, the transducer 16 is excited by an electric pulse, thereby generating a sonic/ultrasonic wave 16a. The sonic/ultrasonic wave, which can be a longitudinal wave, is communicated from the transducer 16 to the body 14. As was noted above, longitudinal waves are advantageous since they minimize background clutter and enable the use of simplified electrical filtering schemes, such as conventional high pass filters, for example. Moreover, longitudinal waves can be generated using low levels of power and, as a result, the components used to generate these low power waves are inherently safer than systems that require higher levels of power for wave generation. The sonic/ultrasonic wave travels through the sensor body 14 and is partially reflected by a distal end 14b (the active sensor surface) of the body 14. The reflected wave 16b then travels back toward and is detected by the transducer 16, which generates a measurable signal at the terminals 20. FIG. 3 shows oscilloscope waveforms 32 of exemplary signals measured by the transducer 16.

When the sensor surface 14b is not in the fluid 30 (e.g., in air 34), the sensor body-air interface has a large acoustic impedance mismatch and generates relatively large reflection signals 36 and 36', as can be seen in FIG. 3. However, when the sensor surface 14b is in the fluid 30, the sensor-body-fluid interface has a smaller acoustic impedance mismatch and thus generates smaller reflection signals 38 and 38'. The difference in the amplitude of the received reflection signal indicates whether the sensing surface 14b is in air (large amplitude) or fluid (small amplitude).

Further, the reflected sonic/ultrasonic waves continue to travel back and forth between the transducer 16 and the sensing surface 14b, thereby generating equally spaced (in time) pulses of gradually decreasing amplitude. Each successive round-trip pulse has a larger amplitude ratio (i.e., the ratio of the reflected signal obtained with the sensor in the fluid to the amplitude obtained with the sensor out of the fluid). For example, the sensor 10 may have a first round-trip pulse having an amplitude ratio of approximately 2.5:1 for air with respect to fluid. The second round-trip pulse amplitude ratio may be approximately 5:1, the third round-trip pulse amplitude ratio may be approximately 8:1, and the fourth round-trip pulse amplitude ratio may be approximately 12:1. This change in ratio can be seen graphically in FIG. 3. As was noted above, these signals or waveforms are available at the sensor terminals 20, which can be coupled to instrument electronics for further processing as discussed below with respect to FIG. 7.

According to another embodiment, the sensor includes a gap formed within the wave guide or sensor body, wherein the gap is between the transducer and an end of the body to be inserted into the fluid. Thus, the gap creates three surfaces within the body from which the sonic/ultrasonic wave can be reflected. The first surface is located at the region where the body transitions into the gap, the second surface is located at the region where the gap transitions back to the body, and the third surface is located at a distal end of the body.

Figure 4A:
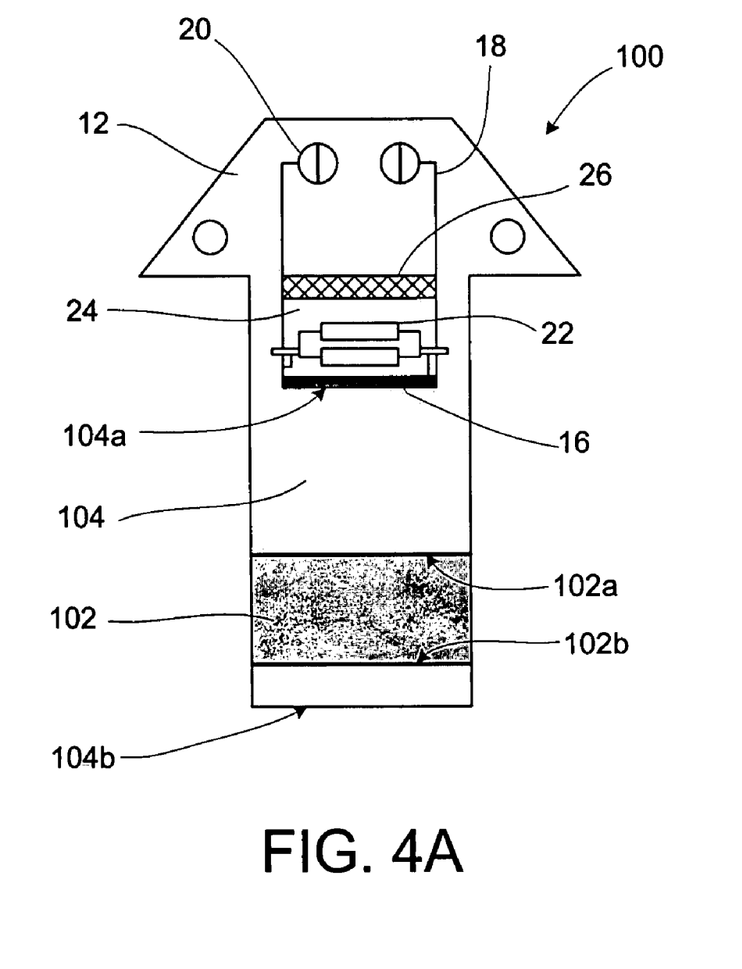
FIGS. 4A and 4B are front and side views of an ultrasonic level sensor in accordance with another embodiment of the invention.
Figure 4B:
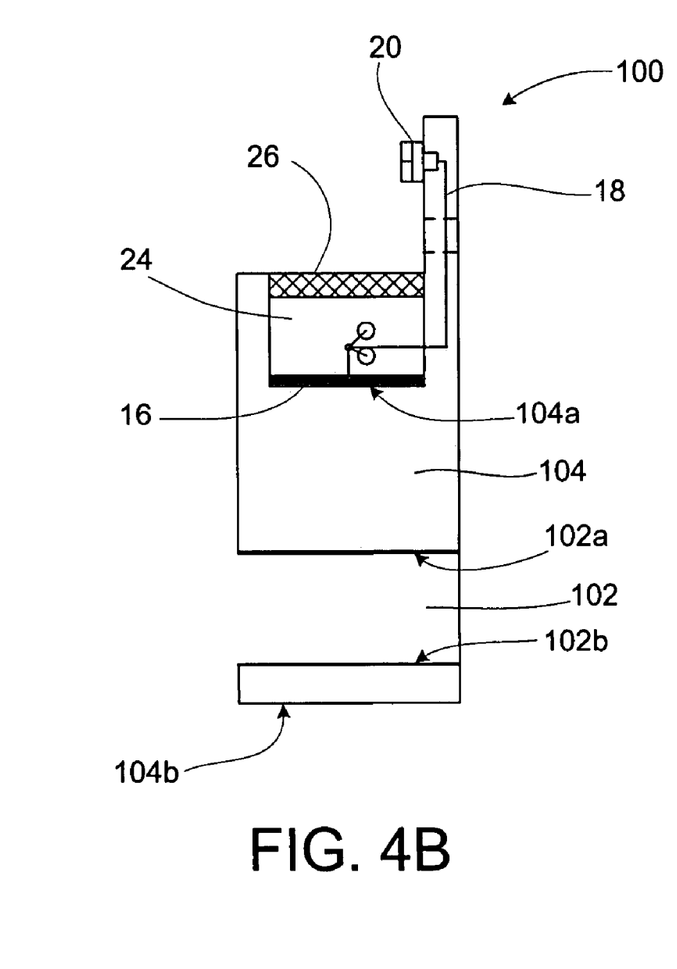

FIGS. 4A-4B illustrate the second embodiment of the fluid level sensor 100. The fluid level sensor 100 is similar to the sensor 10 of FIGS. 1A and 1B, except that the fluid level sensor 100 includes a gap 102 in the sensor body 104. The remaining features of the sensor 100 are similar to the features of the sensor 10 and, therefore, will not be discussed.

As noted above, the gap creates two additional surfaces from which the sonic/ultrasonic wave can bounce or reflect back to the transducer 16. A first surface 102a is formed at the transition from the body 104 to the gap 102, and a second surface 102b is formed at the transition from the gap 102 back to the body 104. A third surface 104b is located at a distal end of the body 104.

In operation, the body 104 is immersed in the fluid such that the fluid occupies the space in the gap 102, and, based on signals provided to terminals 20, sonic/ultrasonic waves are generated by the transducer 16 (e.g., longitudinal waves). As the waves travel through the body 104, they arrive at the first surface 102a, which is the active sensing surface, and a portion of the waves reflect off this surface and back toward the transducer 16. This first reflected signal is referred to as the "internal signal". The sonic/ultrasonic wave also travels through the gap 102 (and fluid therein) and strikes the second surface 102b (i.e., the transition from the gap to the solid body) and a portion of the wave (referred to as the first external signal) also is reflected back toward the transducer 16. The sonic/ultrasonic wave then travels through the solid body 104 and strikes the third surface 104b, wherein a portion of the wave (referred to as the second external signal) is reflected back toward the transducer 16. Surface 102b also can have a thin metal shim bonded to it to enhance the amplitude of the reflected wave (the first external reflection).

Thus, when the body 104 is immersed in the fluid such that the gap 102 is filled with fluid, three separate signals are received by the transducer 16 (the internal signal and the two external signals). However, when the body 104 is not immersed in the fluid (or the gap 102 is not filled with the fluid), only the internal signal is received by the transducer 16.

Additionally, the sensor 100 can be mounted upside-down and, thus, can be located very close to the top of a closed container. In that case, the internal reflection from surface 102a may be immersed in fluid and indicates a low impedance mis-match before the fluid fills the gap 102 and produces external reflections. In this case, surface 102b is the threshold level, instead of surface 102a.

Accordingly, the sensor 100, in addition to using an impedance mismatch technique described with respect to the sensor 10 of FIG. 1A, also can use the above fluid conduction technique to determine the fluid level. By using a combination of the impedance mismatch (which decreases in amplitude when the active sensor surface is immersed) with the fluid conduction technique (which only appears when the active sensor surface is immersed), a much more reliable and robust measurement of the fluid level can be obtained.

Figure 5A:
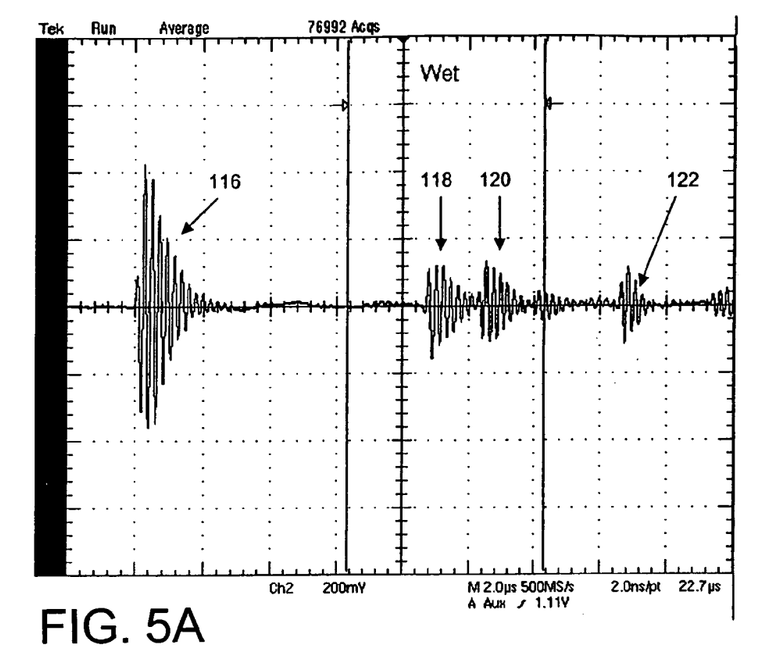
FIGS. 5A and 5B are oscilloscope recordings of measurements obtained using the sensor of FIGS. 4A and 4B.
Figure 5B:
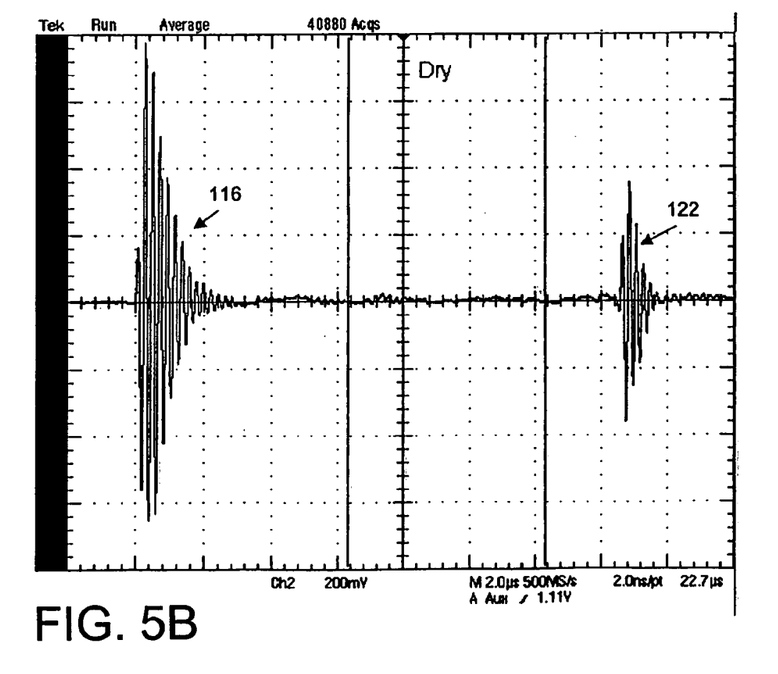

With further reference to FIGS. 5A and 5B, oscilloscope waveforms obtained from the sensor 100 are shown. FIG. 5A was obtained with the body 104 and gap 102 immersed in fluid (e.g., wet) and displays signals 116 and 122 (the first and second round-trip internal reflections) as well as signals 118 and 120 (the external reflections). FIG. 5B was obtained with the body 104 and gap 102 withdrawn from the fluid (e.g., dry) and displays only signals 116 and 122 (the first and second round-trip internal reflections, respectively). Note that in FIG. 5A (the wet condition), signals 116 and 122 are reduced in amplitude The sensors 10 and 100 have a number of advantages over conventional sensors. For example, the internal signal is contained entirely within the sensor body and, thus, is not affected by contamination/degradation of the reflected surface (e.g., the container wall, the fluid, etc.) within the container or fluid, as are conventional sensors. Further, the internal signal is present (at varying amplitudes) regardless of the fluid level and, therefore, is ideal as a built-in-test signal (e.g., it can be used to verify that the sensor and associated electronics are operating properly). Additionally, and as discussed below, the internal signal varies only with temperature and, therefore, can be used to measure the temperature of the sensor.

According to another embodiment, a separate cover or sleeve is placed over the end of the sensor 10. For example, and with reference to FIG. 6, a metal sleeve 50 can be placed over the sensor body 14 of the sensor 10. The sleeve includes sidewalls 52 and a bottom surface 54. Further, the sleeve includes ducts 56 that allow the fluid to enter the gap 58 between the sensor surface 14b and the sleeve bottom surface 54. Preferably, the sleeve 50 is of the same shape as the body (e.g., if the sensor body is cylindrical, then the sleeve also is cylindrical) and is dimensioned so as to allow the sleeve to snugly fit (e.g., an interference fit) over the outer walls of the body 14. As will be appreciated, other methods of attaching the sleeve 50 to the sensor body 14 can be implemented.

Figure 6:
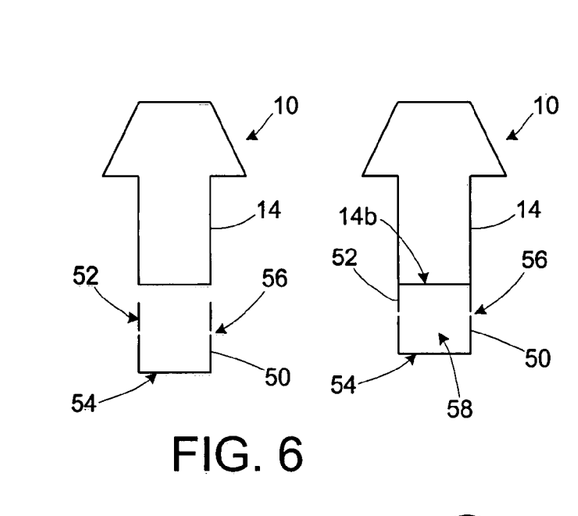
FIG. 6 is a schematic diagram of an ultrasonic sensor in accordance with another embodiment of the invention.

The sleeve 50 enables the sensor 10 to collect both impedance mismatch data and fluid conduction data. More particularly, the area between the end 14b of the sensor and the sleeve bottom surface 54 creates a gap 58 similar to the gap 102 of the sensor 100. Moreover, the metal of the bottom surface 56 provides an enhanced reflection signal when the sensor and sleeve are immersed in the fluid.

As was noted above, the sensors 10 and 100 also can be used to measure temperature. The position of the first and second external signals 116 and 118 in the gapped sensor 100 vary with the fluid properties and temperature. In contrast, the position of the internal signal 116 of each embodiment is dependent only on temperature and, thus, can be used as a temperature sensor. For example, the position of the internal signal 116 can be measured at a known temperature (referred to as the calibrated internal signal). Then, the relative change in position of a later measured internal signal 116 with respect to the calibrated internal signal can be used to indicate the sensor's current temperature. The resolution and accuracy of such temperature measurement is dependent on the temporal resolution of the sensor's instrumentation system. For example, an instrumentation system capable of ten nanosecond temporal resolution can produce a temperature resolution of approximately one degree Celsius. This temperature information can be used to accurately predict the position of additional signals in the gapped sensor 100, or as a general purpose temperature sensor of the fluid.

The sensors 10 and 100 include one or more calibration resistors 22, which are used to minimize voltage levels generated by the transducer 16 when the sensor is subjected to mechanical shock and/or vibration conditions. Further, since the resistor 22 is in parallel with the transducer 16, it can be measured using the same two leads 18 (e.g., via a DC connection). This information can be used to indicate calibration information, such as signal amplitude thresholds, temperature/time references, etc., and identify the sensor, for example. Preferably, the resistor 22 is sized so as to have a negligible loading effect on the high frequency transducer signals (e.g., 1000 ohms or greater).

Data transmitted to and received from the sensors 10 and 100 can be communicated via the instrumentation electronics. There are numerous ways in which the instrumentation electronics could be implemented for the sensors 10 and 100. For example, an analog comparator and a digital window generator could be used to detect if the amplitude of the round trip signal is above or below a fixed threshold. Alternatively, an analog detector and filter could be used to generate a low frequency amplitude envelope that is digitized by a low speed analog-to-digital converter (ADC). A microcontroller then could analyze the digitized data to determine whether the round trip signal amplitudes are high (e.g., dry) or low (e.g., wet). Yet another implementation can use dedicated digital logic (e.g. a complex digital logic device or CPLD) and a microcontroller to directly digitize the high frequency round trip signals via a high speed ADC. The microcontroller can analyze the digitized data to determine whether the round trip signal amplitudes are high (e.g., dry) or low (e.g., wet).

Figure 7:
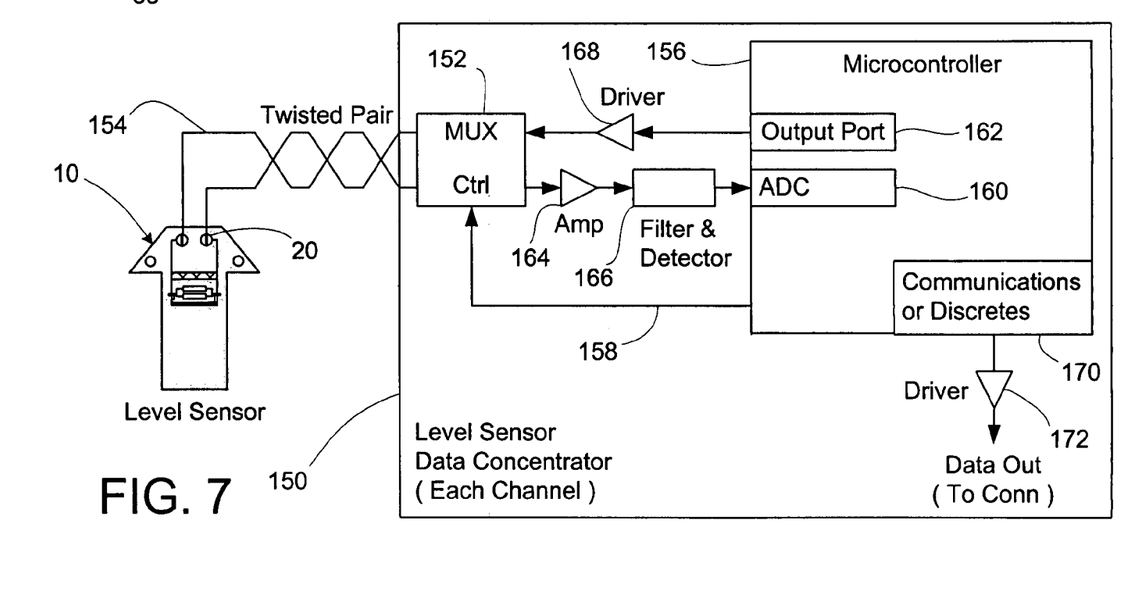
FIG. 7 is a schematic diagram of instrumentation electronics that can be used with the sensor of FIGS. 1A, 4A and 6.

Referring now to FIG. 7, there is provided a schematic diagram of the sensor coupled to an exemplary instrumentation electronics 150. This implementation utilizes a microcontroller and a low speed analog-to-digital converter, as was briefly described above. A multiplexor (MUX) 152 of the instrumentation electronics 150 is electrically coupled to the sensor terminals 20 via a twisted pair conductor 154. A microcontroller 156 is operatively coupled to the MUX 152 via a control line 158 and input/output ports 160 and 162. The input port 160 of the microcontroller 156 can include an analog-to-digital converter, for example, and receives data from the MUX 152 via an amplifier 164 and filter/detector circuit 166. An input of the amplifier 164 is coupled to an output of the MUX 152, and an output of the amplifier 164 is coupled to the filter and detector circuit 166. The filter and detector circuit 166 in turn is coupled to the input port 160 of the microcontroller 156. The output port of the microcontroller 156 is coupled to a driver circuit 168, which in turn is coupled to an input of the MUX 152. The microcontroller also includes a communications port 170 coupled to a driver 172, which can be used to communicate to external devices, for example.

While the instrumentation electronics 150 is shown as a separate or external system, it will be appreciated that the sensor and instrumentation electronics can be an integral or self contained unit.

The instrumentation electronics 150 transmits to and receives data from the sensors 10 and 100 via the twisted pair conductor 154. The data can include, for example, a command to transmit a sonic/ultrasonic signal and/or feedback of the reflected signals 116, 118 and 120. Using this data, the instrumentation electronics 150 can calculate the fluid level, the fluid temperature, the expected position of signals within the gap 102, etc. The instrumentation electronics 150 then can communicate this information to other systems via the communications port 170.

Figure 8:
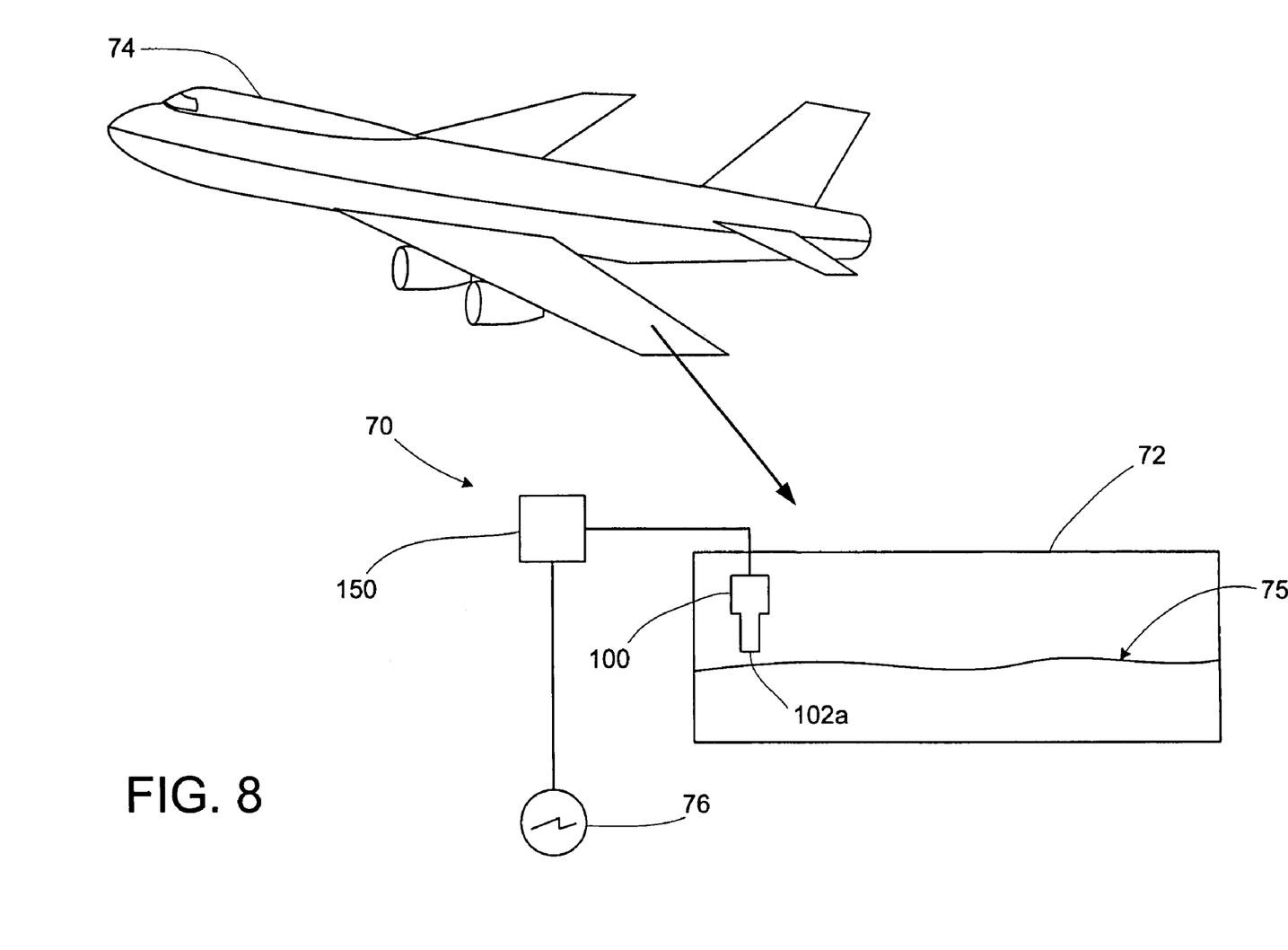
FIG. 8 is a schematic diagram of an aircraft fuel system using an ultrasonic sensor in accordance with an embodiment of the invention.

Referring now to FIG. 8, there is provided an aircraft fuel level monitoring system utilizing a sensor 100 in accordance with an embodiment of the invention. The sensor 100 is placed within the fuel tank 72 of an aircraft 74 such that the sensor provides desired data regarding the fuel level (e.g., the fuel tank is full, empty, half full, etc.). In other words, the sensor can be placed near the top of the fuel tank 72, near the bottom of the fuel tank 72, or somewhere in between.

In monitoring the fuel level 75 in the tank 72, the instrumentation electronics 150 provide command signals to the sensor 100, and receive data from the sensor. When the fuel level 75 within the tank 72 is below the active sensor surface 102a, the sensor detects a large impedance mismatch, which is indicative of a dry sensor (e.g., an empty tank if monitoring for low fuel level conditions). When the fuel level 75 immerses the active sensor surface 102a, the sensor detects a small acoustic impedance mismatch, which is indicative of a wet sensor (e.g., a non-empty fuel tank when monitoring for low fuel conditions). Further, when using the gapped sensor 100, fluid conduction also can be measured to enhance the accuracy of the sensor. Thus, when the sensor is dry, only the internal signal is detected. However, when the sensor is wet, both the internal and the two external signals are detected. Using this data, the instrumentations electronics 150 can provide information to the pilot regarding the fuel level 75 in the tank 72. For example, a fuel warning indicator 76 (e.g., a warning light, a message on a screen, etc.) can be activated or otherwise provide a message when the fuel level is below or above a predetermined level.

Figure 9:
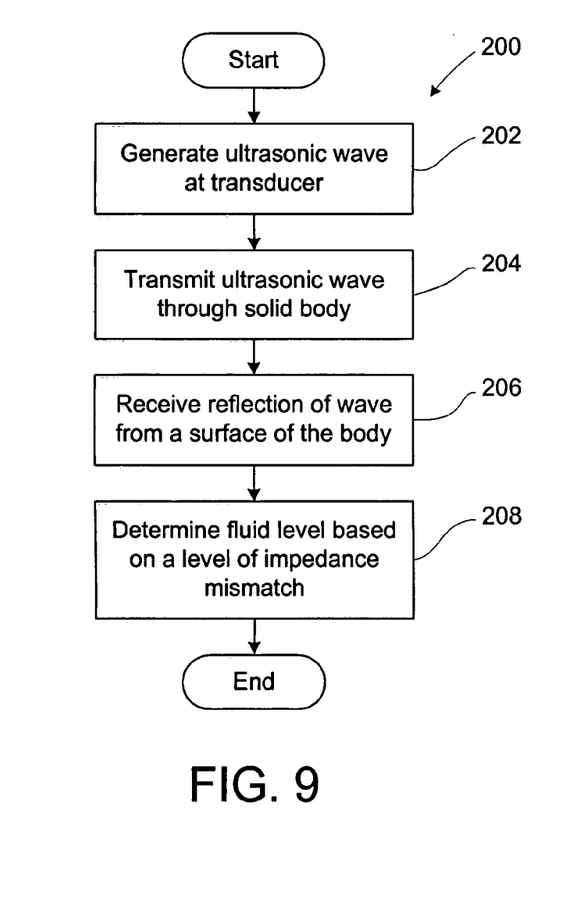
FIG. 9 is a flow chart illustrating a method of measuring a fluid level in accordance with an embodiment of the invention.
Figure 10:
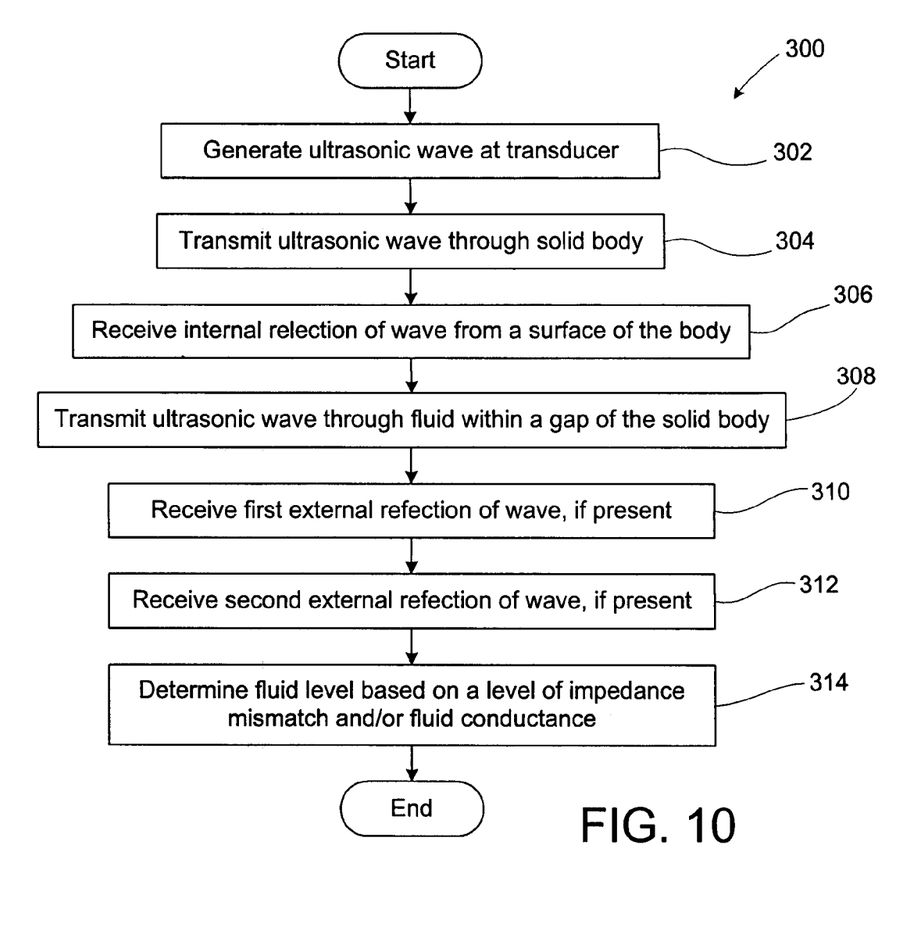
FIG. 10 is a flow chart illustrating a method of measuring a fluid level in accordance with another embodiment of the invention.

Moving now to FIGS. 10 and 11, two flow diagrams 200 and 300 illustrating methods of monitoring a fluid level using a sonic/ultrasonic level sensor in accordance with embodiments of the invention are provided. The flow diagrams include a number of process blocks arranged in a particular order. As should be appreciated, many alternatives and equivalents to the illustrated steps may exist and such alternatives and equivalents are intended to fall within the scope of the claims appended hereto. Alternatives may involve carrying out additional steps or actions not specifically recited and/or shown, carrying out steps or actions in a different order from that recited and/or shown, and/or omitting recited and/or shown steps. Alternatives also include carrying out steps or actions concurrently or with partial concurrence.

Beginning with the flow chart 200 of FIG. 9, a sonic/ultrasonic wave 16a is generated by the transducer 16 (e.g., a piezoelectric transducer), as indicated at step 202. At step 204, the sonic/ultrasonic wave 16a is transmitted through a body 14 of the sensor 10. For example, the transducer 16 can be positioned relative to the body 14 such that the sonic/ultrasonic wave generated by the transducer is communicated to the body. As the sonic/ultrasonic wave 16a travels through the body 14, it reaches a sensor surface 14b of the body and reflects back toward the transducer. At step 206, the transducer 16 receives the reflected wave 16b and provides the data to the instrumentation electronics 150. The instrumentation electronics 150 then at step 208 makes a determination of the level of impedance mismatch at the sensor surface 14b and, based on the mismatch, identifies the sensor surface 14b as being immersed in the fluid or not immersed in the fluid.

More specifically, if the impedance mismatch is high, then the sensor surface 14b is said to be in air (e.g., not immersed in the fluid). However, if the impedance mismatch is low, then the sensor surface 14b is said to be immersed in the fluid. The impedance mismatch can be determined based on the amplitude of the reflected sonic/ultrasonic waves 16b. For example, the amplitude of the waves reflected when the sensor surface 14b is not immersed in fluid is substantially higher than when the sensor surface 14b is immersed in fluid. The instrumentation electronics 150, analyzing the amplitudes of the reflected waves, can determine whether or not the sensor surface 14b is immersed in fluid.

Moving now to the flow chart 300 of FIG. 10, another embodiment of determining the level of a fluid using a sonic/ultrasonic sensor is shown. The method illustrated in the flow chart 300 utilizes an impedance mismatch and/or a fluid conductance to determine the fluid level. Steps 302, 304 and 306 of the flow chart 300 are identical to steps 202, 204 and 206, respectively, of the flow chart 200 and therefore discussion of these steps will be omitted.

Beginning at step 308, the sonic/ultrasonic wave travels from the solid body 104 and into the gap 102 of the sensor 100. If fluid is present in the gap 102, the wave travels through the gap 102 and strikes the second surface 102b. The sonic/ultrasonic wave then is reflected back toward the transducer 16, which detects this second reflected wave (the first external signal) and provides it to the instrumentation electronics 150, as indicated at step 310. The sonic/ultrasonic wave then transitions from the gap back into the sensor body 104 and strikes the third surface 104a. The sonic/ultrasonic wave reflects off the third surface 104a and also travels back toward the transducer 16, which detects the third reflected wave (the second external signal) and also provides it to the instrumentation electronics 150, as indicated at step 312. At step 314, the instrumentation electronics 150 determines the fluid level based on the impedance mismatch, as described above, and/or based on the fluid conductance.

More specifically, if the second and third reflected waves are not detected, then the sensor surface 102a is said to be in air or dry (e.g., not immersed in the fluid). However, if the second and third reflected waves are detected, then the sensor surface 102a is said to be immersed in the fluid. Thus, based on the presence or absence of fluid conductance, the sensor 100 can determine whether the active sensor surface 102a is immersed in fluid. Moreover, by using a combination of impedance mismatch and fluid conductance, a more reliable signal can be obtained.

Accordingly, an apparatus and method for monitoring a fluid level using sonic/ultrasonic waves has been disclosed. The level sensor provides a higher level of precision than conventional sensors, and can be implemented using only two wires.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A fluid level sensor for determining a fluid level within a container, comprising:
   a transducer for generating sonic or ultrasonic waves;
   instrumentation electronics; and
   a wave guide having a first end operatively coupled to the transducer and a second end for immersion into the fluid, said second end spaced a predetermined distance from the first end, wherein a gap is formed between the first end and the second end, wherein a sonic or ultrasonic wave generated by said transducer is injected into said wave guide, and wherein the instrumentation electronics use an impedance mismatch signal and a fluid conductance signal to determine the fluid level, wherein using the impedance mismatch includes monitoring an amplitude of a reflected wave created by the injected wave, and wherein monitoring the amplitude includes comparing the amplitude to a predetermined amplitude, said predetermined amplitude corresponding to a fluid level of interest, wherein when the amplitude is substantially the same as the predetermined amplitude, the instrumentation electronics conclude that the fluid level is at or above the level of interest, and when the amplitude is substantially different from the predetermined amplitude, the instrumentation electronics conclude that the fluid level is below the level of interest.

2. The sensor of claim 1, wherein the gap forms three surfaces from which sonic or ultrasonic waves can be reflected back toward the transducer.

3. The sensor of claim 2, wherein when fluid occupies substantially the entire gap, sonic or ultrasonic waves are reflected from the three surfaces back toward the transducer, and when the gap is not filled with fluid, sonic or ultrasonic waves are reflected from one surface back toward the transducer.

4. The sensor of claim 1, wherein the impedance mismatch signal is based on an internal reflection signal.

5. The sensor of claim 4, wherein the impedance mismatch signal is based on an amplitude of the internal reflection signal.

6. The sensor of claim 1, further comprising at least one suppressor operatively coupled to the transducer, said suppressor reducing the generation of voltages due to mechanical shock or vibration.

7. The sensor of claim 6, wherein the suppressor is a resistor, said resistor selected to define a particular sensor parameter.

8. The sensor of claim 1, wherein at least one sonic or ultrasonic wave reflects off an internal surface of the wave guide and is used to determine the fluid level.

9. The sensor of claim 1, wherein an internal reflection signal is used to verify operation of the sensor.

10. The sensor of claim 1, wherein a time delay of an internal reflection signal relative to a reference signal is used to measure a temperature of the sensor.

11. The sensor of claim 1, wherein the transducer generates longitudinal sonic or ultrasonic waves.

12. The sensor of claim 1, wherein the transducer generates ultrasonic waves in the range of about 1 MHz to about 25 MHz.

13. The sensor of claim 1, wherein the instrument electronics comprises a comparator.

14. The sensor of claim 1, wherein the instrumentation electronics and the sensor form a self-contained sensor.

15. The sensor of claim 1, wherein the wave guide is a solid sensor body.

16. The sensor of claim 1, further comprising a metallic shim coupled to a distal end of the wave guide, said shim increasing an amplitude of a reflected sonic or ultrasonic wave.

17. An aircraft fuel level monitoring system, comprising:
a fuel tank for holding fuel;
an indicator providing a signal indicative of a fuel level in the fuel tank; and
a fluid level sensor as set forth in claim 1 mounted in the fuel tank, wherein the sensor is operatively coupled to the indicator so as to cause the indicator to signal when the fuel is at a predetermined level.

18. The system of claim 17, wherein the fluid level sensor is mounted in a top portion of the fuel tank such that the second end is directed to the top portion of the fuel tank.

19. A method of determining a fluid level within a container, comprising the steps of:
injecting at least one sonic or ultrasonic wave into a wave guide, said wave guide including a gap formed in the wave guide;
determining the fluid level based on a fluid conductance signal and an impedance mismatch signal, wherein determining the fluid level based on the impedance mismatch includes monitoring an amplitude of a reflected wave created by the injected wave, and wherein monitoring the amplitude includes comparing the amplitude to a predetermined amplitude, said predetermined amplitude corresponding to a fluid level of interest,
wherein when the amplitude is substantially the same as the predetermined amplitude, concluding the that the fluid level is at or above the level of interest,
and when the amplitude is substantially different from the predetermined amplitude, concluding that the fluid level is below the level of interest.

20. The method of claim 19, wherein when the impedance mismatch signal is greater than a predetermined level, concluding that the fluid level is below a level of interest.

21. The method of claim 19, wherein when fluid conductance is present, concluding that the fluid level is at or above a level of interest, and when fluid conductance is not present, concluding that the fluid is below the level of interest.

22. The method of claim 19, wherein determining the fluid level based on the fluid conductance includes monitoring the number of reflected waves created by the injected sonic or ultrasonic wave.

23. The method of claim 22, wherein monitoring the number of reflected waves includes comparing the number of reflected waves to a predetermined number of waves, said predetermined number of waves corresponding to a fluid level of interest,
wherein when the number of reflected waves is substantially the same as the predetermined number, concluding that the fluid level is at or above the level of interest,
and when the number of reflected waves is substantially less than the predetermined number, concluding that the fluid level is below the level of interest.

24. A method of determining a fluid level within a container, comprising the steps of:
injecting at least one sonic or ultrasonic wave into a wave guide, said wave guide including a gap formed in the wave guide;
determining the fluid level based on a fluid conductance signal and an impedance mismatch signal;
measuring a first internal reflection signal at a known temperature;
measuring a second internal reflection signal; and
determining a sensor temperature based on a relative change in position of the second internal reflection signal with respect to the first internal reflection signal.

* * * * *